US006862879B2

(12) United States Patent
Upadhyay et al.

(10) Patent No.: US 6,862,879 B2
(45) Date of Patent: Mar. 8, 2005

(54) DIESEL AFTERTREATMENT SYSTEM

(75) Inventors: Devesh Upadhyay, Dearborn, MI (US); Michiel J. van Nieuwstadt, Ann Arbor, MI (US); William Charles Ruona, Farmingtion Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/301,078

(22) Filed: Nov. 21, 2002

(65) Prior Publication Data
US 2004/0098972 A1 May 27, 2004

(51) Int. Cl.$^7$ ................................................. F01N 3/00
(52) U.S. Cl. ............................ 60/286; 60/274; 60/295; 60/301; 60/303
(58) Field of Search ...................... 60/274, 276, 285, 60/286, 295, 301

(56) References Cited

U.S. PATENT DOCUMENTS

| | | |
|---|---|---|
| 4,036,180 A | 7/1977 | Noguchi et al. |
| 4,112,876 A | 9/1978 | Mentschel |
| 4,170,200 A | 10/1979 | Takeuchi et al. |
| 4,222,351 A | 9/1980 | Kosaka et al. |
| 4,403,473 A | 9/1983 | Gladden |
| 4,576,617 A | 3/1986 | Renevot |
| 4,762,093 A | 8/1988 | McCabe et al. |
| 4,854,123 A | 8/1989 | Inoue |
| 5,201,802 A | 4/1993 | Hirota et al. |
| 5,209,061 A | 5/1993 | Takeshima |
| 5,233,934 A | 8/1993 | Krigmont et al. |
| 5,272,871 A | 12/1993 | Oshima et al. |
| 5,367,875 A | 11/1994 | Aboujaoude et al. |
| 5,369,956 A | 12/1994 | Daudel et al. |
| 5,410,873 A | 5/1995 | Tashiro |
| 5,412,946 A | 5/1995 | Oshima et al. |
| 5,426,934 A | 6/1995 | Hunt et al. |
| 5,428,956 A | 7/1995 | Maus et al. |
| 5,479,775 A | 1/1996 | Kraemer et al. |
| 5,522,218 A | 6/1996 | Lane et al. |
| 5,540,047 A | 7/1996 | Dahlheim et al. |
| 5,601,792 A | 2/1997 | Hug et al. |

(List continued on next page.)

FOREIGN PATENT DOCUMENTS

| | | |
|---|---|---|
| EP | 0487886 | 6/1992 |
| WO | WO 99/39809 | 8/1999 |

OTHER PUBLICATIONS

IMECE–2002–DSC–32104, "Modeling of a UREA SCR Catalyst with Automotive Applications", Devesh Upadhyay, Michiel Van Nieuwstadt, pp. 1–77, Proceedings of ASME: IMECE, Nov.–17, 2002, New Orleans.

(List continued on next page.)

Primary Examiner—Thomas Denion
Assistant Examiner—Diem Tran
(74) Attorney, Agent, or Firm—Allan J. Lippa; Alleman Hall McCoy Russell & Tuttle LLP

(57) ABSTRACT

A method for improving NOx conversion efficiency of a lean exhaust gas aftertreatment device by determining an accurate amount of reductant required is presented. The method includes calculating a base reductant injection amount based on a steady state amount of NOx in the engine feedgas and adjusting the base amount to compensate for transient NOx emissions. The method further teaches using an air assist heated reductant delivery system to inject the adjusted base reductant amount into the device, thus further improving NOx conversion efficiency of the device.

17 Claims, 9 Drawing Sheets

U.S. PATENT DOCUMENTS

| | | | |
|---|---|---|---|
| 5,609,022 A | 3/1997 | Cho | |
| 5,609,026 A | 3/1997 | Berriman et al. | |
| 5,628,186 A | 5/1997 | Schmelz | |
| 5,643,536 A | 7/1997 | Schmelz | |
| 5,665,318 A | 9/1997 | Rembold et al. | |
| 5,706,652 A | 1/1998 | Sultan | |
| 5,751,602 A | 5/1998 | Maus et al. | |
| 5,771,689 A | 6/1998 | Bareis et al. | |
| 5,806,310 A | 9/1998 | Daidou et al. | |
| 5,809,775 A | 9/1998 | Tarabulski et al. | |
| 5,831,145 A | 11/1998 | Logothetis et al. | |
| 5,842,341 A | 12/1998 | Kibe | |
| 5,845,487 A | 12/1998 | Fraenkle et al. | |
| 5,884,475 A * | 3/1999 | Hofmann et al. | 60/274 |
| 5,884,476 A | 3/1999 | Hirota et al. | |
| 5,893,267 A | 4/1999 | Vogtlin et al. | |
| 5,910,096 A | 6/1999 | Hepburn et al. | |
| 5,921,076 A | 7/1999 | Krutzsch et al. | |
| 5,924,280 A | 7/1999 | Tarabulski | |
| 5,941,067 A | 8/1999 | Hirota et al. | |
| 5,943,858 A | 8/1999 | Hofmann et al. | |
| 5,950,422 A | 9/1999 | Dolling | |
| 5,992,141 A * | 11/1999 | Berriman et al. | 60/274 |
| 6,001,318 A | 12/1999 | Tillaart et al. | |
| 6,003,305 A | 12/1999 | Martin et al. | |
| 6,016,653 A | 1/2000 | Glassey et al. | |
| 6,017,503 A | 1/2000 | Kato et al. | |
| 6,021,640 A | 2/2000 | Hirota et al. | |
| 6,038,854 A | 3/2000 | Penetrante et al. | |
| 6,041,594 A * | 3/2000 | Brenner et al. | 60/309 |
| 6,050,088 A * | 4/2000 | Brenner | 60/303 |
| 6,066,303 A | 5/2000 | Sudduth et al. | |
| 6,079,203 A | 6/2000 | Wakamoto | |
| 6,082,102 A | 7/2000 | Wissler et al. | |
| 6,089,015 A | 7/2000 | Strehlau et al. | |
| 6,119,448 A | 9/2000 | Emmerling et al. | |
| 6,119,451 A | 9/2000 | Vogtlin et al. | |
| 6,122,909 A | 9/2000 | Murphy et al. | |
| 6,122,910 A | 9/2000 | Hoshi et al. | |
| 6,125,629 A | 10/2000 | Patchett | |
| 6,131,388 A | 10/2000 | Sasaki et al. | |
| 6,134,883 A | 10/2000 | Kato et al. | |
| 6,167,698 B1 * | 1/2001 | King et al. | 60/286 |
| 6,171,566 B1 | 1/2001 | Ku et al. | |
| 6,182,443 B1 | 2/2001 | Jarvis et al. | |
| 6,182,444 B1 | 2/2001 | Fulton et al. | |
| 6,192,675 B1 | 2/2001 | Hirota et al. | |
| 6,209,315 B1 | 4/2001 | Weigl | |
| 6,221,324 B1 | 4/2001 | Coq et al. | |
| 6,233,925 B1 | 5/2001 | Hirota et al. | |
| 6,260,353 B1 * | 7/2001 | Takahashi | 60/286 |
| 6,266,955 B1 | 7/2001 | Liang et al. | |
| 6,269,633 B1 | 8/2001 | van Nieuwstadt et al. | |
| 6,273,120 B1 * | 8/2001 | Hofmann et al. | 137/98 |
| 6,294,141 B1 | 9/2001 | Twigg et al. | |
| 6,299,847 B1 | 10/2001 | Allen | |
| 6,301,879 B1 * | 10/2001 | Weisweiler et al. | 60/274 |
| 6,305,160 B1 | 10/2001 | Hammerle et al. | |
| 6,311,480 B1 | 11/2001 | Suzuki et al. | |
| 6,314,722 B1 | 11/2001 | Matros et al. | |
| 6,314,919 B1 | 11/2001 | Pugachev | |
| 6,357,223 B1 | 3/2002 | Caren et al. | |
| 6,357,226 B2 | 3/2002 | Borland | |
| 6,383,463 B1 | 5/2002 | Mochida et al. | |
| 6,387,336 B2 | 5/2002 | Marko et al. | |
| 6,415,602 B1 * | 7/2002 | Patchett et al. | 60/286 |
| 6,449,945 B1 | 9/2002 | van Nieuwstadt | |
| 6,470,673 B1 * | 10/2002 | van Nieuwstadt et al. | 60/274 |
| 6,487,852 B1 | 12/2002 | Murphy et al. | |
| 6,491,885 B1 | 12/2002 | Tokunaga et al. | |

OTHER PUBLICATIONS

IMECE–2002–DSC–32103, "Control Design of an Automotive UREA SCR Catalyst", Devesh Upadhyay, Michiel Van Nieuwstadt, pp. 1–8, Proceedings of ASME:IMECE, Nov.–17, 2002, New Orleans.

SAE 2001–01–0514, "Advanced Urea SCR Catalysts for Automotive Applications", Gleshoff et al., Detroit, MI, Mar. 5–8, 2001.

SAE 952493, "An Urea Lean NOx Catalyst System for Light Duty Diesel Vehicles", H. Luders et al., Toronto, Ontario, Oct. 16–19, 1995.

SAE 2001–01–3623, "Application of Urea SCR to Light Duty Diesel Vehicles", Lambert et al.

* cited by examiner

US 6,862,879 B2

DIESEL AFTERTREATMENT SYSTEM

FIELD OF INVENTION

The present invention relates to a system and a method for improving performance of a lean exhaust gas aftertreatment device and, more particularly, to controlling an amount of reductant injection to achieve optimum NOx conversion efficiency while minimizing the fuel economy penalty.

BACKGROUND AND SUMMARY OF THE INVENTION

Current emission control regulations necessitate the use of catalysts in the exhaust systems of automotive vehicles in order to convert carbon monoxide (CO), hydrocarbons (HC), and nitrogen oxides (NOx) produced during engine operation into harmless exhaust gasses. Vehicles equipped with diesel or lean gasoline engines offer the benefits of increased fuel economy. Such vehicles have to be equipped with lean exhaust aftertreatment devices, such as, for example, an Active Lean NOx Catalysts (ALNC) or Selective Catalytic Reduction (SCR) catalysts, which continuously reduce NOx emissions, even in an oxygen rich environment, through active injection of reductant, such as fuel (HC) or urea, into the exhaust gas entering these devices. Further, it is important to precisely control the amounts of reductant and to optimize its delivery methods in order to achieve maximum NOx conversion efficiency.

The inventors herein have recognized NOx conversion efficiency of a lean exhaust gas aftertreatment device can be improved by adjusting the amounts of reductant injected to account for variation in feedgas NOx production due to engine transient behaviors, such as changes in the pedal position, or the EGR valve position. For example, NOx production generally increases during pedal tip-ins, and therefore, the amount of reductant supplied to the exhaust gas aftertreatment device may be increased to compensate for additional NOx produced. Additionally, the inventors have recognized that mixing the adjusted amount of reductant with air and vaporizing the mixture prior to introducing it into the device can further improve NOx conversion efficiency of the device.

In accordance with the present invention, a system and a method for controlling an amount of reductant to be delivered to an exhaust gas aftertreatment device are presented. The method includes calculating a desired amount of reductant based on a measure of engine transient behavior; injecting said calculated desired amount of reductant into a heated reductant delivery system; injecting air into said reductant delivery system thereby creating a vaporized mixture of said injected reductant and said air; and directing said vaporized mixture into the exhaust gas aftertreatment device. In one aspect of the present invention, the device is an ALNC and the reductant is hydrocarbon. In another aspect of the present invention, the measure of engine transient behavior is an instantaneous change in pedal position. In yet another aspect of the present invention, the device is an SCR catalyst and the reductant is urea.

The present invention provides a number of other advantages. In particular, NOx conversion efficiency of the exhaust gas aftertreatment device is improved by adjusting the injected reductant amounts to compensate for transient increases or decreases in the engine feedgas NOx amounts. Another advantage of the present invention is improved fuel economy due to optimized reductant usage. Yet another advantage of the present invention is that NOx conversion efficiency is further improved by using an air assist heated reductant delivery system to deliver reductant to the exhaust gas aftertreatment device.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

Figure 1A:
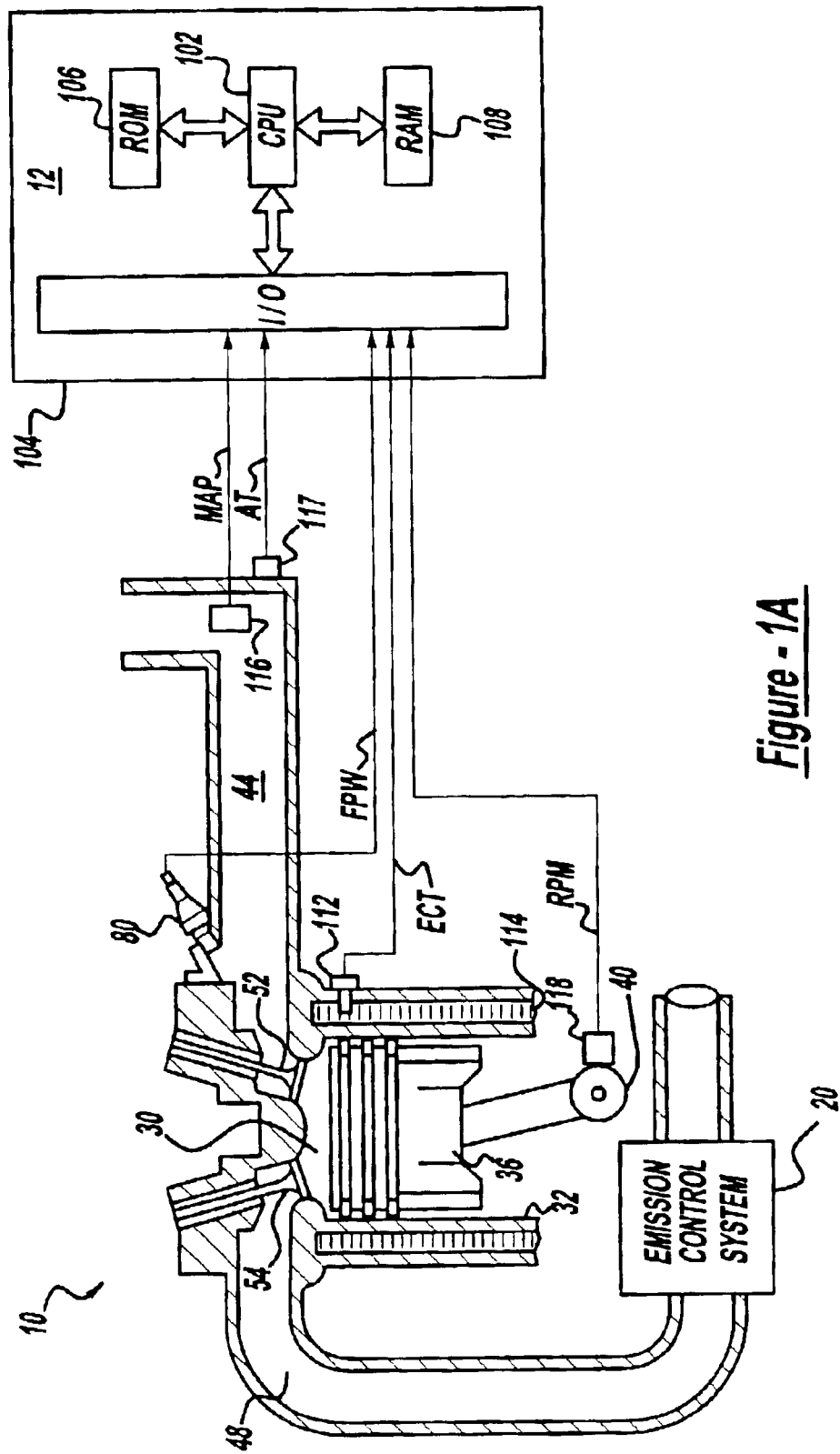
FIGS. 1A and 1B are schematic diagrams of an engine wherein the invention is used to advantage.

Internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system including a fuel tank, fuel pump, and fuel rail (not shown).

Controller 12 is shown in FIG. 1A as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

An emission control system 20, coupled to an exhaust manifold 48, is described in detail in FIG. 2 below.

Figure 1B:
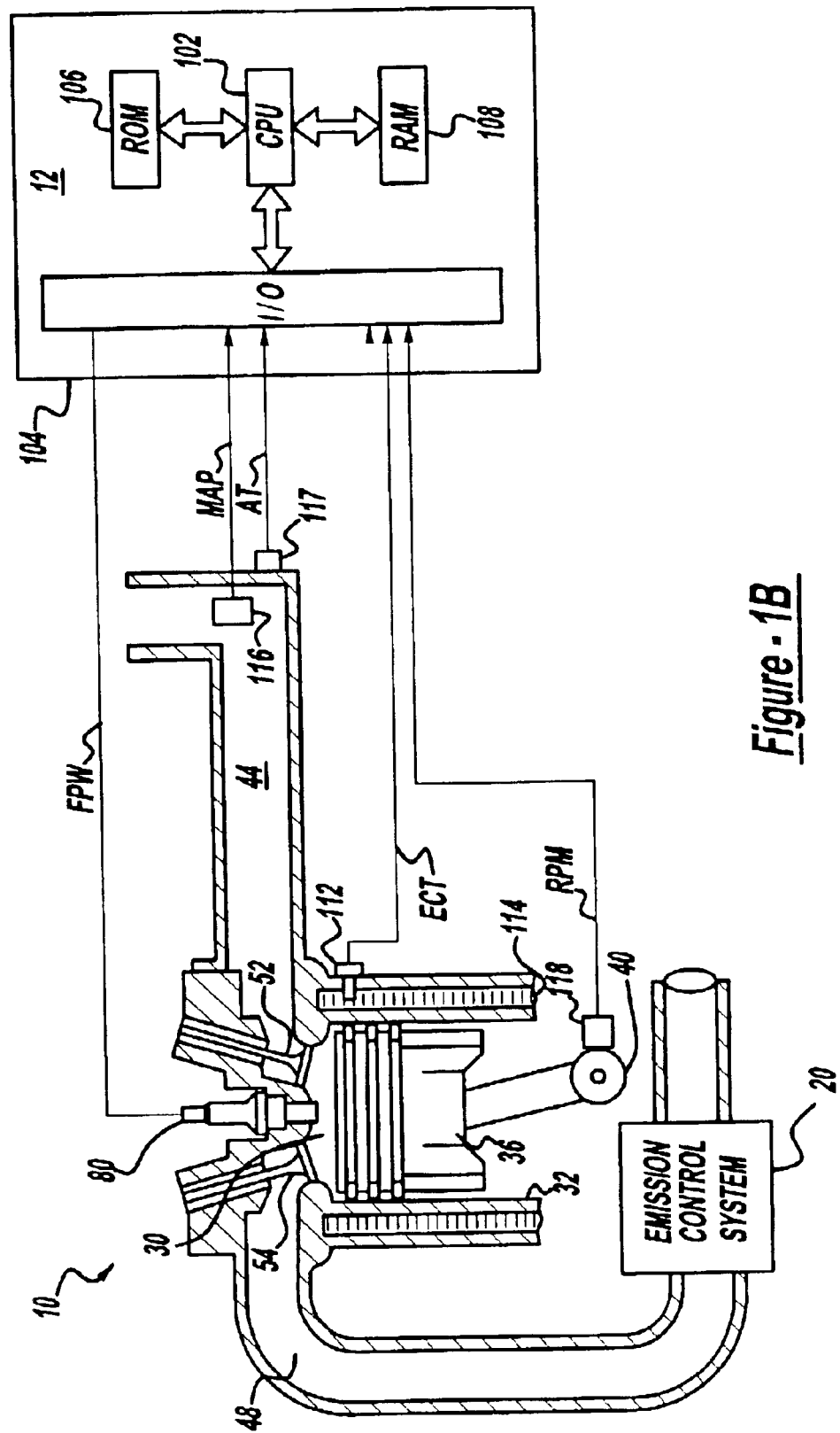

Referring now to FIG. 1B, an alternative embodiment is shown where engine 10 is a direct injection engine with injector 80 located to inject fuel directly into cylinder 30.

Figure 2:
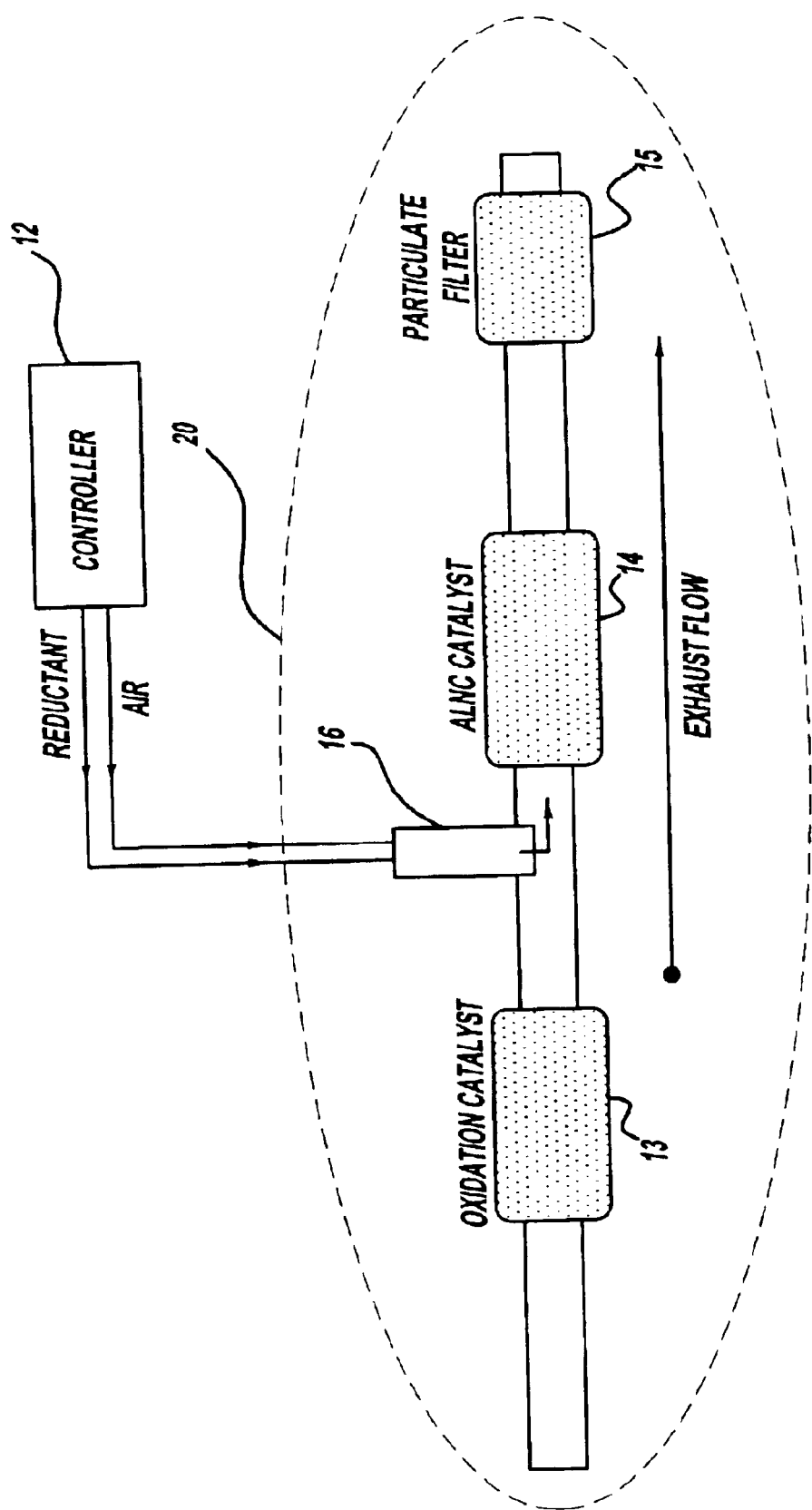
FIG. 2 is a an example of one embodiment of an emission control system wherein the present invention is used to advantage.

Referring now to FIG. 2, an example of one embodiment of an emission control system wherein the present invention is used to advantage is described. Emission control system 20 is coupled downstream of an internal combustion engine 10 described with particular reference in FIGS. 1A and 1B. Catalyst 14 is an Active Lean NOx Catalyst (ALNC) capable of reducing NOx in an oxygen rich environment. In an alternative embodiment (not shown), catalyst 14 may be a urea-based Selective Catalytic Reduction (SCR) catalyst. Oxidation catalyst 13 is coupled upstream of the ALNC and may be a precious metal catalyst, preferably one containing platinum. The oxidation catalyst exothermically combusts hydrocarbons (HC) in the incoming exhaust gas from the engine thus supplying heat to rapidly warm up the Active Lean NOx Catalyst (ALNC) 14. Additionally, carbon monoxide (CO) produced as a result of HC combustion in the oxidation catalyst 13 improves NOx reduction in the ALNC. Particulate filter 15 is coupled downstream of the ALNC and is capable of storing carbon particles from the exhaust.

A reductant delivery system 16 is coupled to the exhaust gas manifold between the oxidation catalyst and the ALNC. Alternative embodiments of the reductant delivery system are described later herein with particular reference to FIGS. 3A–3C.

Figure 3A:
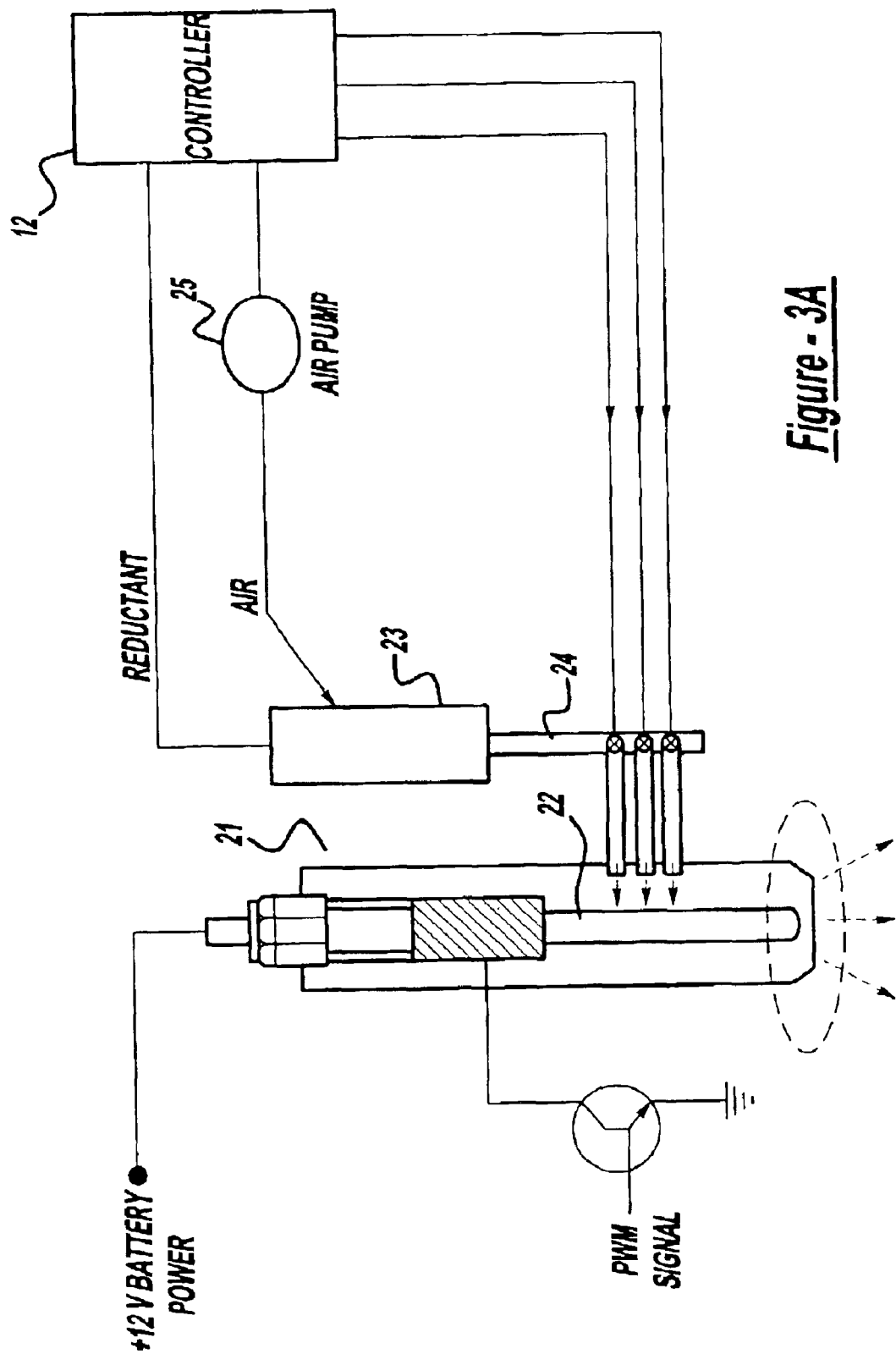
FIGS. 3A, 3B and 3C are examples of reductant delivery systems in accordance with the present invention.

The diagram of FIG. 3A generally represents an example of one embodiment of a reductant delivery system according to the present invention. The system comprises an evaporator unit 21 housing an elongated heating element 22. In this example, the heating element is an electrically heated cylindrically shaped heating element. Alternatively, the heating element could be rectangular shaped to increase its surface contact area with the injected reductant and air mixture.

In yet another alternative embodiment, an oxidizing catalytic coating may be added to the evaporator unit such as, for example, a coating on the inner surface of the heating element housing and a catalytic cap at the point where the evaporated reductant and air mixture enters the exhaust gas manifold, to facilitate CO generation. The catalytic coating may be a precious metal coating, preferably one containing Platinum or Palladium. Controller 12 controls the temperature of the heating element by providing a PWM signal of varying duty cycles. The duty cycle of the PWM control signal to the heating element is determined from a prestored table based on operating conditions to achieve desired heating element temperature. The mixing unit 23 has a reductant inlet and an air inlet and an outlet 24 coupled to the evaporator unit 21 through which a mixture of reductant and air is injected into the housing and subsequently comes into contact with the surface of the heating element 22.

In an alternative embodiment (not shown), both air and reductant can be injected through a single input. The reductant can be supplied to the mixing unit 23 from the fuel tank or from a storage vessel. Air pump 25 supplies pressurized air to the mixing unit 23 thereby creating a mixture of reductant and air. Outlet 24 is configured to deliver the reductant and air mixture to more than one area on the surface of the heating element. Controller 12 can selectively enable and disable injection of the mixture to these areas depending on operating conditions, such as engine speed, load, exhaust gas temperature, etc. For example, when the amount of reductant required is high, such as at high load conditions, it may be necessary to enable delivery of the reductant and air mixture to more than one area on the surface of the heating element. Alternatively, outlet 24 may be configured to deliver the reductant and air mixture to a specific area on the surface of the heating element.

Figure 3B:
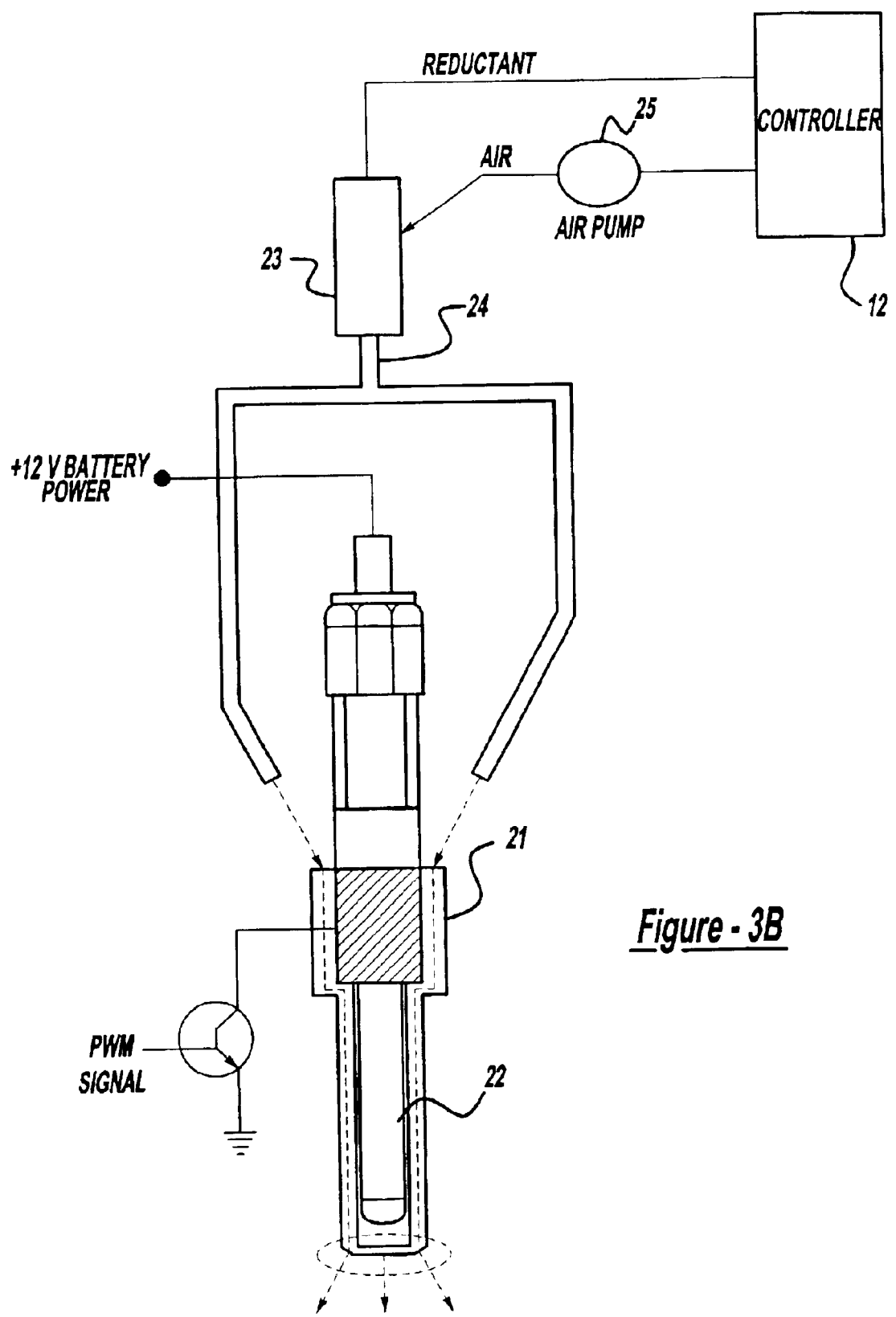

FIG. 3B shows an alternate design for the heating element housing. As can be seen in the drawing, the heating element is surrounded by a delivery tube the inner diameter of which is wide enough to allow the heating element to be housed. The delivery tube has a narrow channel drilled into it, which serves as a passage for the air and reductant mixture. The air and reductant mixture is injected into the narrow channel and is rapidly vaporized by the heat provided by the enclosed heating element without coming into direct contact with its surface. In this embodiment, the durability of the heating element is further improved since the reductant and air mixture never comes into direct contact its surface. The delivery tube has one or more holes at its tip through which the evaporated reductant and air mixture enters the exhaust gas manifold.

Figure 3C:
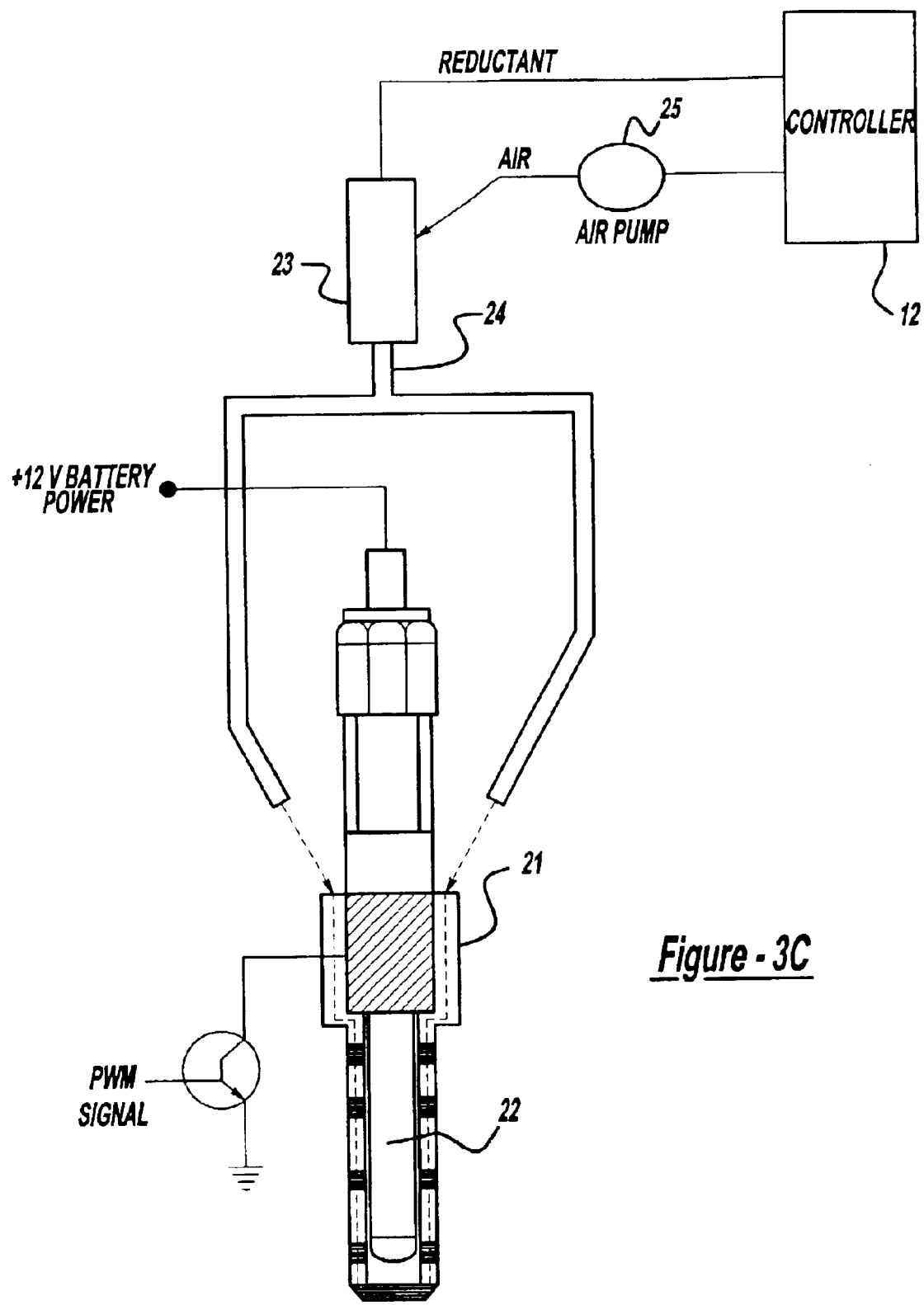

FIG. 3C shows an alternative embodiment of the heating element housing shown in FIG. 3B wherein a porous oxidizing catalytic plug, preferably one containing Platinum or Palladium, is placed at the tip of the delivery tube to facilitate conversion of the vaporized hydrocarbons to carbon monoxide. Additionally, one or more ports may be drilled into the delivery tube along its length and plugged up with porous oxidizing catalytic material to further facilitate conversion of hydrocarbons into carbon monoxide.

Therefore, according to the present invention, an improved reductant delivery system and method are presented. Mixing reductant with air causes the reductant to be well distributed inside the reductant delivery system and thus speeds up the vaporization process. Also, system durability is improved by reducing lacquering and soot deposits through better distribution of the reductant and faster evaporation process. The system performance is further improved through the addition of an oxidizing catalytic coating.

As will be appreciated by one of ordinary skill in the art, the routines described in FIGS. 4 and 5 below may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Figure 4:
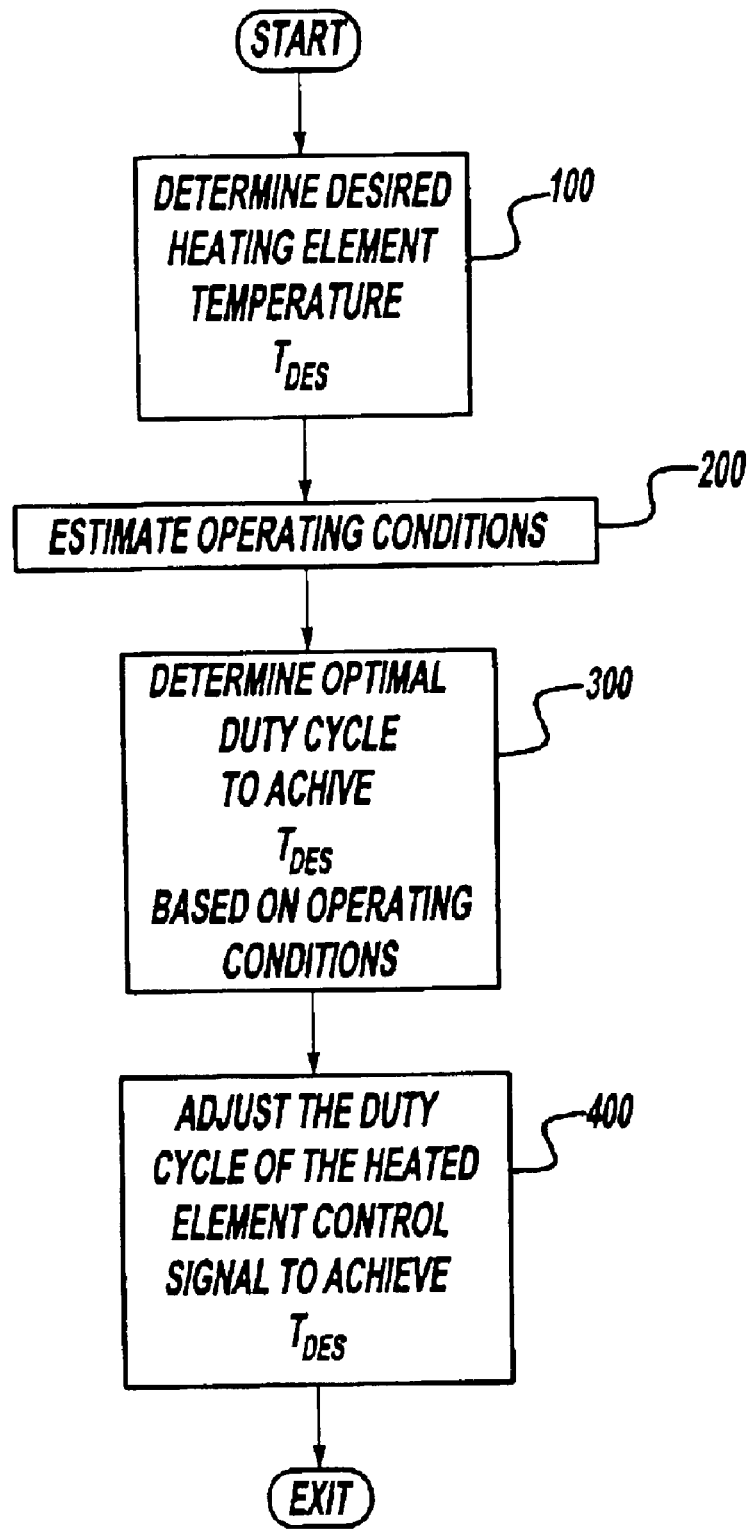
FIG. 4 is a high level flowchart of an exemplary routine for controlling a temperature of the heating element of a reductant delivery system in accordance with the present invention.

Referring now to FIG. 4, an exemplary routine for controlling the temperature of the heating element of the reductant delivery system in accordance with the present invention is described. First, in step 100, desired heating element temperature, $T_{des}$, is determined. This determination is based on what function the reductant evaporator system is performing, such as whether the mixture is to be evaporated or combusted. Next, the routine proceeds to step 200 wherein operating conditions known to have an effect on the heating element temperature, such as the exhaust gas temperature upstream of the ALNC, are evaluated. The exhaust gas temperature can be determined from a temperature sensor coupled in the exhaust gas manifold, or estimated based on parameters such as engine speed, load, engine temperature, ignition timing, etc. Next, in step 300, optimal duty cycle to achieve desired heating element temperature is determined from a prestored experimentally determined temperature map of the heating element based on operating conditions such as the exhaust gas temperature in this example. The routine then proceeds to step 400 wherein the duty cycle of the heating element control signal is adjusted to achieve desired heating element temperature. The routine then exits.

Therefore, by generating a map of the heating element temperature based on operating conditions, such as the exhaust gas temperature, or any parameter known to affect the temperature of the heated element, it is possible to dynamically control the temperature of the heated element to achieve optimal reductant and air mixture delivery while minimizing power consumption and preventing overheating of the heating element. In other words, it is possible to take advantage of the heat provided by the exhaust gas passing through the reductant delivery system when controlling the temperature of the heating element. For example, higher exhaust gas temperature result in less power requirements, while lower exhaust gas temperatures result in higher power requirements. It is also possible to completely turn off power supply when the exhaust gas temperature is high enough to keep the heating element at desired temperature, such as at high engine load conditions.

Figure 5:
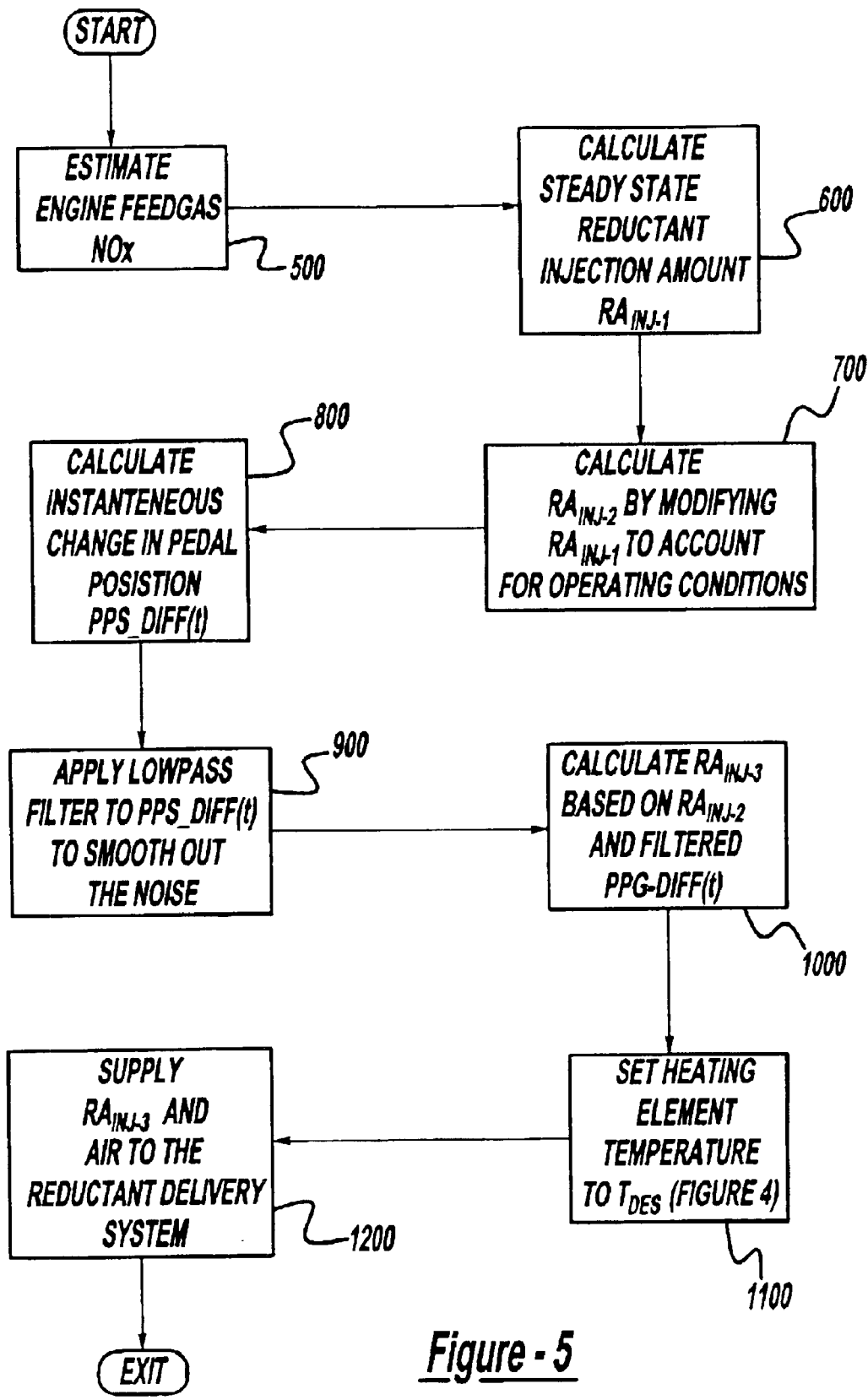
FIGS. 5 and 6 describe an exemplary routine and a modification curve for determining an amount of reductant to be delivered to the exhaust gas aftertreatment device in accordance with the present invention.

Referring now to FIG. 5, an exemplary routine for controlling injection of a reductant into exhaust flow using a reductant delivery system as described in FIGS. 3A–3C is presented. First, in step 500, the amount of NOx in the exhaust gas mixture entering the device, $NOx_{fg}$, is estimated based on engine operating conditions. These conditions may include engine speed, engine load, exhaust temperatures, exhaust gas aftertreatment device temperatures, injection timing, engine temperature, and any other parameter know to those skilled in the art to indicate the amount of NOx produced by the combustion presses. Alternatively, a NOx sensor may be used to measure the amount of NOx in the exhaust gas mixture. Next, in step 600, the steady-state reductant injection amount, $RA_{inj\_1}$, is calculated based on the following equation:

$$\frac{(RA_{fg} + RA_{inj\_1})}{NOx_{fg}} = R_{des}$$

wherein $RA_{fg}$ is the amount of reductant in the engine feedgas, which can be determined based on engine operating conditions. This initial reductant amount, $RA_{inj\_1}$, is evaluated at steady state and yields a base reductant quantity to be injected for each engine speed and load point. The amount is calibrated to achieve a certain feedgas reductant to NOx ratio, $R_{des}$. The ratio is typically obtained as a trade-off between NOx conversion and the fuel penalty due to reductant injection, and in this example is set at approximately 10. Next, in step 700, the steady-state base reductant injection amount, $RA_{inj\_1}$, is modified to account for engine operating conditions, such as engine coolant temperature, $T_c$, exhaust gas temperature, $T_{eg}$, EGR valve position, $EGR_{pos}$, start of injection, SOI, and other parameters:

$$RA_{inj\_2} = RA_{inj\_1} \cdot f_1(T_c) \cdot f_2(T_{eg}) \cdot f_3(SOI) \cdot f_4(EGR_{pos})$$

Figure 6:
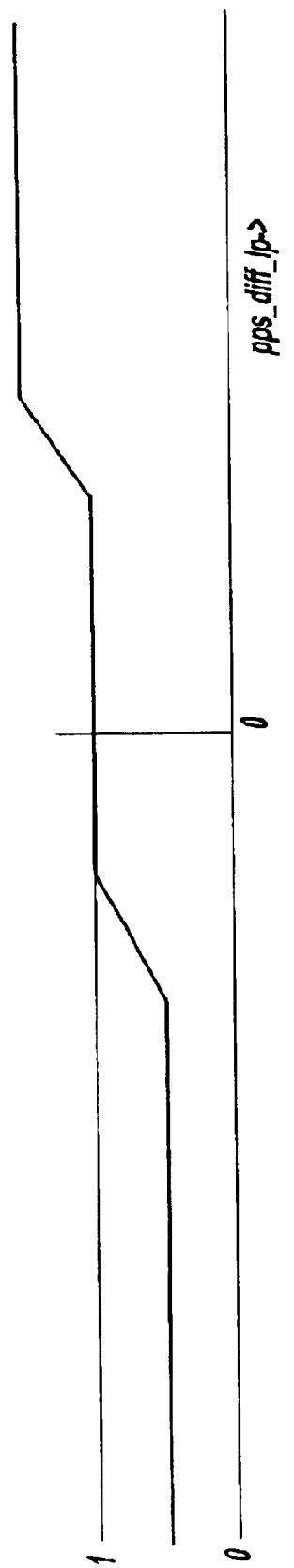

The routine then proceeds to step 800 wherein the instantaneous change in the pedal position is computed as follows:

$$pps\_diff(t) = \frac{(pps(t) - pps(t-1))}{T_s}$$

where $T_s$ is the sampling rate, and pps(t) denotes the pedal position at time t. Next, in step 900, a low pass filter is applied to smooth out the noise:

$$pps\_diff\_lp(t) = (1-k_f) \cdot pps\_diff\_lp(t-1) + k_f pps\_diff(t-1)$$

where $k_f$ controls the rate of filtering. The routine then proceeds to step 1000 wherein the reductant amount is further modified to account for engine transient behaviors as represented by the changes in the pedal position:

$$RA_{inj\_3} = RA_{inj\_2} \cdot f_5(pps\_diff\_lp)$$

where function $f_5$ is shaped to allow overinjection of reductant during pedal position tip-in and underinjection of reductant during pedal position tip-out. In an alternative embodiment, instead of pedal position, engine speed or fuel demand sensor, or any other parameter known to those skilled in the art to provide a measure of engine transient behavior may be used to obtain $RA_{inj\_3}$. Next, in step 1100, the desired temperature of the heating element is adjusted as described with particular reference to FIG. 4, thus achieving optimum temperature for reductant and air mixture evaporation. The routine then proceeds to step 1200 wherein $RA_{inj\_3}$ and air are supplied to the reductant delivery system. In an alternative embodiment, the areas on the surface of the heating element to which a reductant and air mixture is injected could be selected a prestored map based on such parameters as the amount of reductant to be delivered, engine load, speed, exhaust gas temperature, catalyst temperature, throttle position, etc. For example, at high engine loads it may be desirable to inject the reductant and air mixture faster than at low engine loads, and delivery to more than one area will therefore be enabled. The routine then exits. An example of $f_5$ is shown with particular reference to FIG. 6.

Therefore, according to the present invention, in order to achieve more efficient exhaust aftertreatment device performance, the amount of reductant to be injected should be adjusted to account for increases and decreases in the amount of NOx in the exhaust gas entering the device. This can be accomplished by continuously monitoring engine parameters that are capable of providing a measure of engine transient behaviors, such as a pedal position sensor, and continuously adjusting the amount of reductant to be injected as a function of filtered instantaneous changes in these parameters. Since NOx production typically increases at tip-in and decreases at tip-out, the result of such operation would be to increase the base injected amount in the former case, and decrease the base injected amount in the latter case. Further, using a reductant vaporizer unit ensures fast system response, more efficient system operation, better emission control, and improved fuel economy. In an alternative embodiment, the exhaust gas aftertreatment device may be a Selective Catalytic Reduction (SCR) catalyst, and the reductant may be urea.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. A method for, controlling an exhaust gas aftertreatment device and an exhaust system coupled downstream of an internal combustion engine, comprising:

calculating an initial reductant amount;

adjusting said initial reductant amount to compensate for engine transient behavior;

injecting said adjusted initial amount of reductant and air into a heated reductant delivery system thereby causing said reductant and air to evaporate, said heated reductant delivery system heated in part by a heating element and protruding into an exhaust gas downstream of said internal combustion engine; and introducing said evaporated reductant and air mixture into the exhaust gas aftertreatment device.

2. The method as set forth in claim 1 wherein the exhaust gas aftertreatment device is an ALNC.

3. The method as set forth in claim 2 wherein said reductant includes hydrocarbon.

4. The method as set forth in claim 1 wherein the exhaust gas aftertreatment device is an SCR catalyst.

5. The method as set forth in claim 4 wherein said reductant is urea.

6. The method as set forth in claim 1 wherein the engine is a diesel engine and wherein the exhaust system includes a particulate filter.

7. The method as set forth in claim 1 wherein said initial amount of reductant is based on a steady state estimate of an amount of NOx in an engine exhaust gas.

8. The method as set forth in claim 1 wherein said engine transient behavior is measured by calculating an instantaneous change in a pedal position.

9. A system for improving NOx conversion efficiency of a lean exhaust gas aftertreatment device coupled downstream of an internal combustion engine, comprising:

a reductant delivery system including at least a heating element, said system adapted to communicate with an exhaust gas entering the lean exhaust gas aftertreatment device, said reductant delivery system protruding into said exhaust gas; and a controller supplying reductant and air to said reductant delivery system, wherein said reductant delivery system mixes said reductant and air, and then directs said mixture to said heating element, wherein an amount of said supplied reductant is adjusted based on a measure of change in engine behavior to compensate for variations in an amount of NOx in said exhaust gas mixture due to said measure of engine behavior change, said controller adjusting said heating element based on an operating condition to vaporize said reductant in said air before said mixture is routed to the exhaust gas.

10. The system as set forth in claim 9 wherein the lean exhaust gas aftertreatment device is an ALNC.

11. The system as set forth in claim 10 wherein said reductant includes hydrocarbon.

12. The system as set forth in claim 9 wherein the lean exhaust gas aftertreatment device is an SCR catalyst.

13. The system as set forth in claim 10 wherein said reductant is urea.

14. The system as set forth in claim 9 wherein the engine is a diesel engine and wherein the exhaust system includes a particulate filter.

15. The system as set forth in claim 9 wherein said heating element is housed in an interior portion of said reductant delivery system, and said mixture is directed to an exterior of said heating element.

16. A method for controlling an exhaust gas aftertreatment device coupled downstream of an internal combustion engine, comprising:

injecting an amount of reductant and air into a heated reductant delivery system thereby causing said reductant and air to evaporate, said heated reductant delivery system heated in part by an elongated heating element and protruding into an exhaust gas downstream of said internal combustion engine, wherein said evaporated reductant and air mixture enters said exhaust gas through a delivery tube with one or more holes, said delivery tube partially enclosing said heating element;

introducing said evaporated reductant and air mixture into exhaust gas of the engine; and varying at least said amount of reductant to compensate for engine transient behavior.

17. A method for controlling an exhaust gas device coupled downstream of an internal combustion engine, comprising:

injecting an amount of reductant and air into a heated reductant delivery system thereby causing said reductant and air to evaporate, said heated reductant delivery system heated in part by a heating element and protruding into an exhaustgas downstream of said internal combustion engine, wherein said evaporated reductant and air mixture enters said exhaust gas through a delivery tube with one or more holes, said delivery tube partially enclosing said heating element;

introducing said evaporated reductant and air mixture into the exhaust gas upstream of a particulate filter; and varying at least said amount of reductant to compensate for engine transient behavior.

* * * * *